Patented Mar. 4, 1941

2,233,417

UNITED STATES PATENT OFFICE 2,233,417

PROCESS OF PREPARING VITAMIN C

Charles G. King and William A. Waugh, Pittsburgh, Pa.

No Drawing. Application September 18, 1933, Serial No. 690,027

2 Claims. (Cl. 167—81)

This invention relates to a therapeutic agent having a protective anti-scorbutic activity and to a method of producing and administering the same.

More particularly the invention relates to the production of vitamin C and to methods and products by which this vitamin may be administered in accurately controlled amounts.

It has been recognized that certain plant juices contain vitamin C. For example, it is known that the juice of lemons, cabbages, tomatoes and potatoes contains this vitamin, and such juices have been used for administering the vitamin to patients in need thereof. Among the objections, however, to the use of natural or concentrated juices for this purpose are the flavor or irritation of the juices which are distasteful to many persons and the fact that the quantity of vitamin C present in natural or concentrated juices is small so that large doses must be administered.

We have been able to isolate the pure vitamin so that now it may be administered conveniently in adequate and in accurate amounts free from, or mixed with known amounts of other ingredients. We have found that the vitamin may be obtained as a crystalline substance, as a soluble salt, or as the free acid either in syrup form or in aqueous or in alcoholic solutions. The vitamin in any one of these forms in therapeutic doses is practically tasteless and may therefore be added readily to food substances and medicinal agents without rendering the latter distasteful as when natural or concentrated citrus juices are added. Further, with the vitamin in any of these forms, it is possible to accurately control the dosage administered, as will be readily apparent. Moreover, it is now possible to administer the product intravenously.

Three liters of lemon juice are filtered through muslin, 210 g. of copper-free basic lead carbonate added and the mixture stirred. After about 3 hours 500 cc. of a saturated neutral lead acetate solution is added and the stirring continued during 30 minutes. The precipitate, which is inactive, is separated by centrifugation and washed.

The filtrate, which contains the vitamin, is treated with 1:3 ammonium hydroxide until the pH reaches 7.6 (phenol red). (During this operation a stream of carbon dioxide is bubbled through the solution.)

The yellow precipitate, which contains the active substance, is separated by centrifugation, redissolved in 1:3 acetic acid, and reprecipitated by the addition of ammonia water to a pH of 7.6.

The precipitate is redissolved by adding slowly 1:1 hydrochloric acid until the solution is distinctly acid to Congo red and the mixture extracted with ½ volume of n-butyl alcohol to remove oily impurities. Ethyl alcohol is then added to a concentration of 75% and the inert precipitate of lead chloride removed.

The solution is evaporated to about 10 cc. Next, 100 cc. of acetone are added, the salt precipitate centrifuged, and enough barium carbonate added to neutralize to Congo red all free acid. The filtrate is evaporated to dryness in vacuo in the presence of white sea sand (5g.), a few cc. of dry benzene added and again evaporated in order to assist dehydration.

The vitamin is extracted from the sand mixture with 200 cc. of dry acetone, separated and the solution evaporated. The dry residue is dissolved in 30 cc. of absolute n-propyl alcohol which is then cooled to 0° C. and treated with an equal volume of dry petroleum ether (B. P. 30–60°). The bulk of the vitamin remains in solution but in order to secure a sharp separation the precipitates are redissolved and reprecipitated as before and then discarded.

The active solutions are combined, evaporated to dryness, redissolved in a minimum amount of n-propyl alcohol, chilled and reprecipitated with high-boiling petroleum ether (B. P. 135–150°) allowing the mixture to stand in a $P_2O_5$ vacuum desiccator during 24 hours if necessary. The product may be recrystallized from anhydrous methyl alcohol and light petroleum ether and may be rinsed with ice-cold glacial acetic acid or dry acetone. The final yield consists of 300–500 mg. of a white crystalline product melting at 190° C.$\pm 2°$ which in a dosage of 0.5 to 0.75 mg. per day protects guinea pigs, maintained on a scorbutic diet, from the symptoms of scurvy. The effective treatment dose for guinea pigs suffering from scurvy is 0.75 to 1.00 mg. per day. The crystalline solid is the vitamin C and can be recrystallized readily from butyl alcohol, propyl alcohol, acetone, ethyl acetate, ethyl alcohol, or methyl alcohol, by the addition of petroleum ether.

A study of this isolated vitamin C has shown the same to be an hexuronic acid having the following formula: $C_6H_8O_6$. It may be obtained either in the manner above discussed or by synthetically producing the same according to the teachings of synthetic chemistry.

Vitamin C, sometimes called ascorbic acid, is according to our discovery an hexuronic acid which we have designated as hexuronic acid C. It may be crystallized rapidly from solution in mixed solvents or a series of solvents. It may be precipitated as a lead salt from water or as a lead, calcium or potassium salt from alcohol. We have found that the crystalline form is possibly the best for the reason that it is a dry stable substance.

Hexuronic acid C may be administered therapeutically in a number of different ways. Thus, it may be made up in tablet form by mixing the desired quantity of hexuronic acid C with sugar of milk. It may be supplied in solution and administered hypodermically. It may be added to milk, breakfast foods, fruit juices, carbonated preparations, ginger ale or other beverages, or other food substances desired. By virtue of the fact that in therapeutic doses it is tasteless and may be obtained in a readily soluble form, it may be conveniently added to food substances without in any way rendering the latter distasteful. Thus, by the addition of hexuronic acid C to food substances in general use, such as bread, milk, canned vegetables, soups, or the like, this vitamin may be daily administered to the public generally.

Whether the hexuronic acid C is mixed with food products and medicines, incorporated in tablets, or formed in solution for hypodermic injection, it will be apparent that the quantity thereof administered and the composition of material used may be accurately controlled, thus eliminating the uncertainty of prior methods of administering vitamin C.

In the previous description we have given a detailed method for obtaining vitamin C but it is unnecessary that all of the details be strictly followed and in order to indicate more generally the more important steps of the process, the following is given:

The natural source of the vitamin C, such as lemon juice, is first decitrated. An excess of a lead or calcium salt, such as lead acetate, is added and the reaction made faintly alkaline, preferably with ammonia, precipitating the vitamin as the lead salt. The lead is then precipitated in acid solution and further impurities removed from the solution by extraction with a solvent which does not dissolve the vitamin C such as butyl alcohol. The solution is concentrated by evaporation and further impurities removed by precipitation with acetone, following which the solution may be evaporated to dryness. The vitamin may then be extracted from inert material by small amounts of such solvents as propyl alcohol or acetone. Addition of petroleum ether to the solution then precipitates further impurities, and in larger amount causes precipitation of the vitamin. Recrystallization of the vitamin may be accomplished by use of methyl, ethyl or propyl alcohols, with or without the addition of petroleum ether or dioxan. Acetone and ethyl acetate may also be used for recrystallization, but generally with less satisfactory results.

While methods of isolating vitamin C have been described and while certain products have been mentioned as being adapted for use in the administering of the vitamin, it is to be understood that the methods described and the examples given are for the purposes of illustration only and are not to be construed as definitive of the limits of the inventive idea. The right is reserved to make all departures from the above described methods and examples which will fall within the purview of the attached claims.

What we claim as our invention is:

1. In the method of isolating vitamin C from lemon juice the steps comprising decitrating said lemon juice and precipitating out the vitamin C with a copper-free basic lead compound, extracting oily impurities from an acid solution of the vitamin C precipitate by means of butyl alcohol, adding ethyl alcohol to the extracted solution to precipitate insoluble physiologically inert lead salt and after separating said inert lead salt adding acetone to produce a further substantially inert precipitate, filtering off the latter precipitate, evaporating the filtrate to dryness with enough barium carbonate to neutralize the acid therein, extracting the dry product with, and subsequently reprecipitating the physiologically active principle from, a non-reactive solvent of the nature of the group comprising methanol, ethanol, propanol, acetone, ethyl acetate and combinations of these with petroleum ether and dioxan.

2. In the method of isolating vitamin C from lemon juice the steps comprising decitrating said lemon juice and precipitating out the vitamin C with a copper-free basic lead compound, extracting oily impurities from an acid solution of the vitamin C precipitate by means of butyl alcohol, adding ethyl alcohol to the extracted solution to precipitate insoluble physiologically inert lead salt and after separating said inert lead salt adding acetone to produce a further substantially inert precipitate, filtering off the latter precipitate, evaporating the filtrate to dryness with enough barium carbonate to neutralize the acid therein, extracting the dry product with, and subsequently reprecipitating the physiologically active principle from, a non-reactive solvent of the nature of the group comprising methanol, ethanol, propanol, acetone, ethyl acetate and combinations of these with petroleum ether and dioxan, extracting the dry product with acetone, evaporating the acetone from the extract, taking up the residue in normal propyl alcohol and crystallizing and separating the active principle therefrom after addition of petroleum ether.

CHARLES G. KING.
WILLIAM A. WAUGH.